United States Patent [19]
Levens

[11] Patent Number: 5,371,660
[45] Date of Patent: Dec. 6, 1994

[54] ILLUMINATION SYSTEM AND METHOD

[75] Inventor: Kurt A. Levens, Chelsea, Mass.

[73] Assignee: Massachusetts Institute of Technology, Cambridge, Mass.

[21] Appl. No.: 152,930

[22] Filed: Nov. 16, 1993

Related U.S. Application Data

[63] Continuation of Ser. No. 828,754, Jan. 31, 1992, abandoned.

[51] Int. Cl.$^5$ ............................................. F21S 1/14
[52] U.S. Cl. ..................................... 362/145; 362/32; 362/92; 362/293; 362/373
[58] Field of Search .................. 362/145, 32, 92, 293, 362/373; 359/591, 592, 858; 385/900, 901

[56] References Cited

U.S. PATENT DOCUMENTS

| | | | |
|---|---|---|---|
| 4,152,752 | 5/1979 | Niemi ................................... | 362/209 |
| 4,260,220 | 4/1981 | Whitehead .......................... | 385/133 |
| 4,539,625 | 9/1985 | Bornstein et al. ...................... | 362/32 |
| 4,720,170 | 1/1988 | Learn, Jr. .............................. | 359/597 |
| 4,816,975 | 3/1989 | Bahnemann et al. ................. | 362/32 |
| 5,016,152 | 5/1991 | Awai et al. ........................... | 362/293 |
| 5,111,367 | 5/1992 | Churchill ............................. | 362/293 |

OTHER PUBLICATIONS

OCLI Catalog, Commercial Products Division, Copyright 1989.

Aizenberg, J. B., et al. "A New Principle of Lighting Premises by Means of the Illuminating Devices with the Slit Lightguides," pp. 412–425.

Bennett, David J., "Solar Optics: Light as Energy; Energy as Light," *Underground Space*, vol. 4, No. 6, pp. 349–354.

Bergman, R. S., "Halogen IR Lamp Development: A System Approach," 1991.

Duguay, M. A., et al. "Lighting with Sunlight Using Sun Tracking Concentrators," *Applied Optics*, vol. 16, No. 5, May, 1977, pp. 1444–1446.

Engle, Claude et al. "Hong Kong Bank Scoops the Sun," *Lighting Design*, Nov., 1986, pp. 5–11.

Fraas, L. M., et al., "Concentrated and Piped Sunlight for Indoor Illumination," *Applied Optics*, vol. 22, No. 4, 15 Feb. 1983, pp. 578–582.

Johnson, K. et al., "Light Guide Design Principles," Nov., 1986, pp. 1–21.

Lawrence Berkeley Laboratory, "Windows & Lighting Program," 1989 Annual Report, pp. 1–18.

Lawrence Berkeley Laboratory, "Windows and Lighting Program," Mar., 1989, pp. 5-1–5-18.

Leslie, R. P., "Core Daylighting: Building Code Issues," pp. 407–410.

"TVA Office Complex-A Teamwork Approach to Energy Efficiency," *Lighting Design & Application*, Nov., 1980, pp. 31–38.

Littlefair, Paul J., "The Luminous Efficacy of Daylight: A Review," *Lighting Research & Technology*, vol. 17, No. 4, 1985, pp. 162–173.

(List continued on next page.)

*Primary Examiner*—Richard R. Cole
*Assistant Examiner*—L. Heyman
*Attorney, Agent, or Firm*—Testa, Hurwitz & Thibeault

[57] ABSTRACT

An illumination system includes an artificial radiant source that emits energy in the visible and infrared regions of the spectrum. A radiation splitter splits the majority of the visible energy from the majority of the infrared energy to form an illumination beam and a heating beam. A light conductor conducts portions of the visible light to at least one area to be illuminated, and a heat recovery system recovers energy from the heating beam and provides it at an energy output. A solar collector may direct a solar beam on the radiation splitter to supplement the artificial source beam. A supporting portion may support a lighting fixture. An artificial illumination source is placed at a position that is unsupported by the supporting portion, and a light conductor provides an optical path for radiation produced by the source to the fixture.

8 Claims, 9 Drawing Sheets

OTHER PUBLICATIONS

Littlefair, Paul J., "Innovative Daylighting: Review of Systems and Evolution Methods," *Lighting Research and Technology*, 1990, pp. 1–17.

Manzini, Ezio, *The Material of Invention*, "Creating the Transparent," 1989, p. 214.

Ngai, Peter Y., "Solar Illumination for Interior Spaces," *Lighting Design & Application*, Apr., 1983, pp. 26–33.

Rodgers, Nancy C., "The Potential of Beam Sunlighting," *Lighting Design & Application*, Nov., 1979, pp. 33–35.

Shanus, Michae D. et al., "Going Beyond the Perimeter With Daylight," *Lighting Design & Applicatiion*, Mar., 1984, pp. 30–40.

Smart, M., "Tracking Mirror Beam Sunlighting For Deep Interior Spaces," Solar Energy, vol. 30, No. 6, pp. 527–536, 1983.

Ruck, Nancy, et al., "The Passive Daylighting of Building Interiors," *Proceedings of the Second International Daylighting Conference*, vol. 31, pp. 87–98.

Whitehead, L. A., et al., "Large-Scale Core Daylighting by Means of a Light Pipe," pp. 416–419.

Whitehead, L. A., "New Efficient Light Guide for Interior Illumination," *Applied Optics*, vol. 21, No. 15, pp. 2755–2757.

Whitehead, Lorne A., "A New Device for Distributing Concentrated Sunlgiht in Building Interiors," *Energy and Buildings*, 1984, pp. 119–125.

Winston, Roland, "Nonimaging Optics," *Scientific American*, Mar., 1991, pp. 2–7.

Zastrow, Armin et al., "Daylighting with Mirror Light Pipes and with Fluorescent Planar Concentrators," *SPIE*, vol. 692, 1986, pp. 237–234.

The NiOptics Corporation, "The Proprietary Technology".

Van, Jon, *Chicago Tribune* "Casting Technology in a Whole New Light," Mar. 4, 1991, pp. 1–2.

Arch, "Bridging Science and Industry," Jan., 1991, pp. 1–15.

TIR Systems Ltd., "Introducing a Whole New Way to Light up the Night. The Lightpipe Building Highlighting System," 1988.

ILLUMINATION SYSTEM AND METHOD

This is a continuation Ser. No. 07/828,754 filed on Jan. 31, 1992 now abandoned.

BACKGROUND OF THE INVENTION

The invention relates to illumination systems, and in particular to illumination systems that include optical channels for distributing light.

The proficiency with which lamps produce and deliver light into a building is described by the product of two terms, luminous efficacy and luminous efficiency. The luminous efficacy (or simply efficacy) of a source is an efficiency at which a lamp converts electrical energy into visible light, and is expressed in lumens per watt. The luminous efficiency (or simply efficiency) of a fixture is the percentage of light that escapes the fixture in relation to the amount of light that is generated inside of it by the lamp, and may be affected by fixture design and the accumulation of dust and dirt on luminaire, lamp, and room surfaces.

Systems for collecting sunlight and distributing it within a building have been proposed and some such systems have been built. These systems generally include a solar collector and an optical path for directing received light to areas within the building. They may also include a cold mirror or the like for diverting the infrared portion of the solar spectrum to make electricity or heat. The use of an optical path for the distribution of artificially generated light has also been proposed. Products exist that include a lamp and a light guide, permitting exclusion of the lamp from environments with explosion or fire hazardous conditions, environments sensitive to radio and magnetic interference, cooled spaces, and locations (e.g., above swimming pools) where relamping is difficult.

Selectively reflective coatings have been provided on tungsten lamps to reflect radiated energy in the near-infrared back to the filament of the lamp.

Artificial illumination, however, generally remains an inefficient process.

SUMMARY OF THE INVENTION

In one general aspect, the invention comprises an illumination system including an artificial radiant source that emits energy in the visible and infrared regions of the spectrum. A radiation splitter splits the majority of the visible energy from the majority of the infrared energy to form an illumination beam and a heating beam. A light conductor conducts portions of the visible light to at least one area to be illuminated, and a heat recovery system recovers energy from the heating beam and provides it at an energy output. A solar collector may direct a solar beam on the radiation splitter to supplement the artificial source beam.

The invention may also comprise a lighting system, which includes a supporting portion that supports a lighting fixture. An artificial illumination source is placed at a position that is unsupported by the supporting portion, and a light conductor provides an optical path for radiation produced by the source to the fixture.

The illumination system of the invention is particularly well suited to conventional illumination sources, some of which have an excellent perceived quality of light, but tend to radiate a lot of energy outside of the visible range. A large portion of this energy may be recovered because the system may recover energy at a high thermodynamic efficiency by concentrating radiated heat onto a small, high-temperature heat recovery area. This recovery can also be performed without dissipating artificially generated light in the heat recovery system.

The illumination system of the invention is also particularly well suited to the efficient and economical use of solar energy in buildings. Indeed, an integrated solar/artificial illumination system with central heat recovery is sufficient for around-the-clock illumination, and its cost may be offset by the elimination of separately wired electric luminaires. The integrated system is superior to daylighting supplemented by localized electric luminaires, as heat generated by the artificial sources is recovered centrally, rather than being not only wasted, but a load on the building's air conditioning as well. Installation costs of the integrated system of the invention are low because it permits the recovery of solar energy in areas where a completely separate solar system might not be economical, and/or the recovery of heat from artificial sources in applications where this recovery might not be justified by itself.

The system according to the invention permits easy cleaning and replacement of bulbs and the like because they are centrally located, and these operations may be performed during the day, while light is supplied by the sun. Cleaning and replacement operations may therefore be performed at a significantly lower expense by regular daytime employees, adding to the savings afforded by the system. If desired, these cleaning operations may then be performed more frequently, thereby increasing energy efficiency, or the centralized fixture may be shielded from dust and other contaminants to further reduce the cost of keeping the sources clean. Certain structures for supporting luminaires, such as utility poles, may be made at a reduced cost, as they need not support an electric source and associated fixturing.

DESCRIPTION OF THE INVENTION

Figure 1:
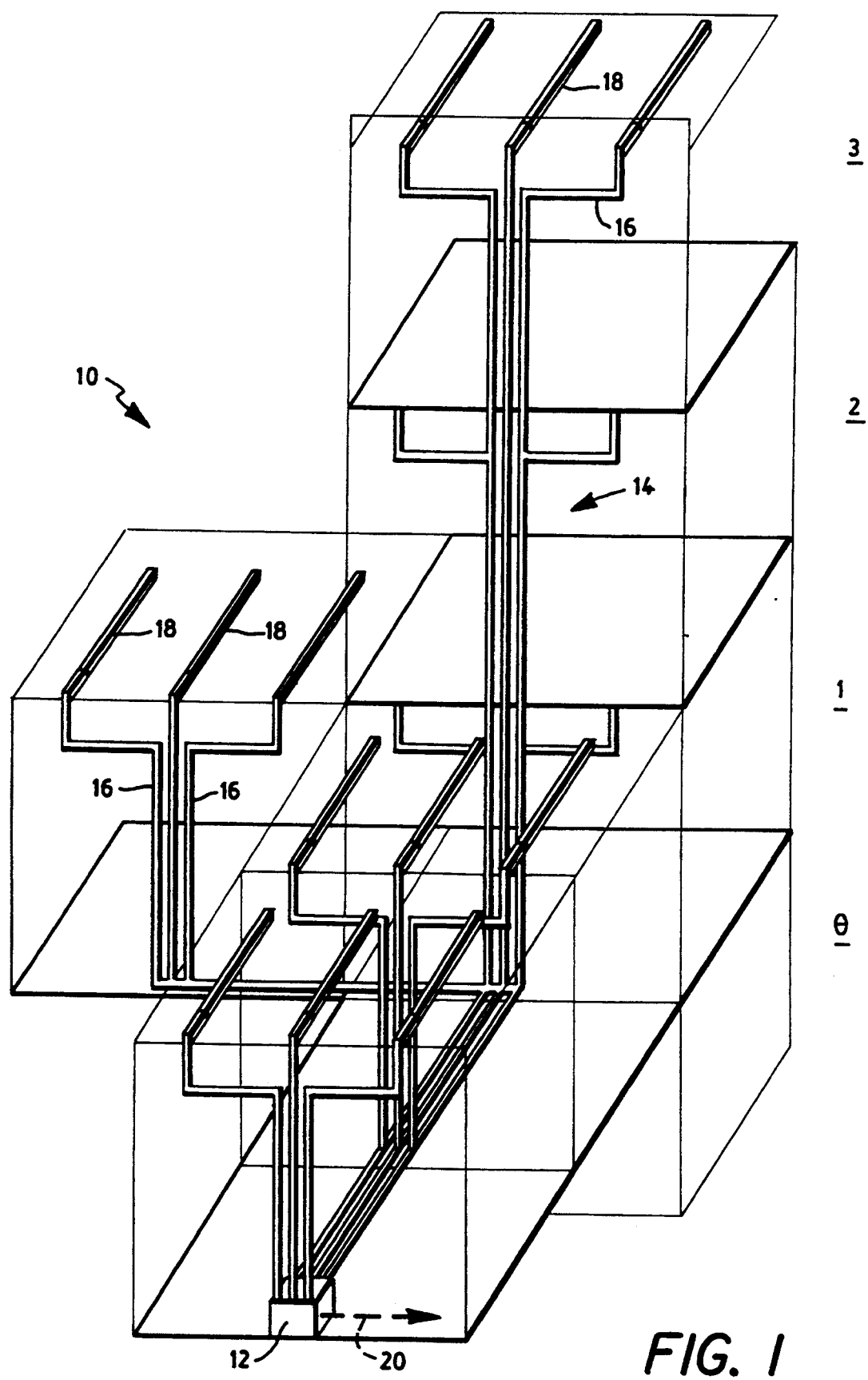
FIG. 1 is a diagrammatic perspective view of a multi-story building equipped with an illumination system according the invention.
Figure 2:
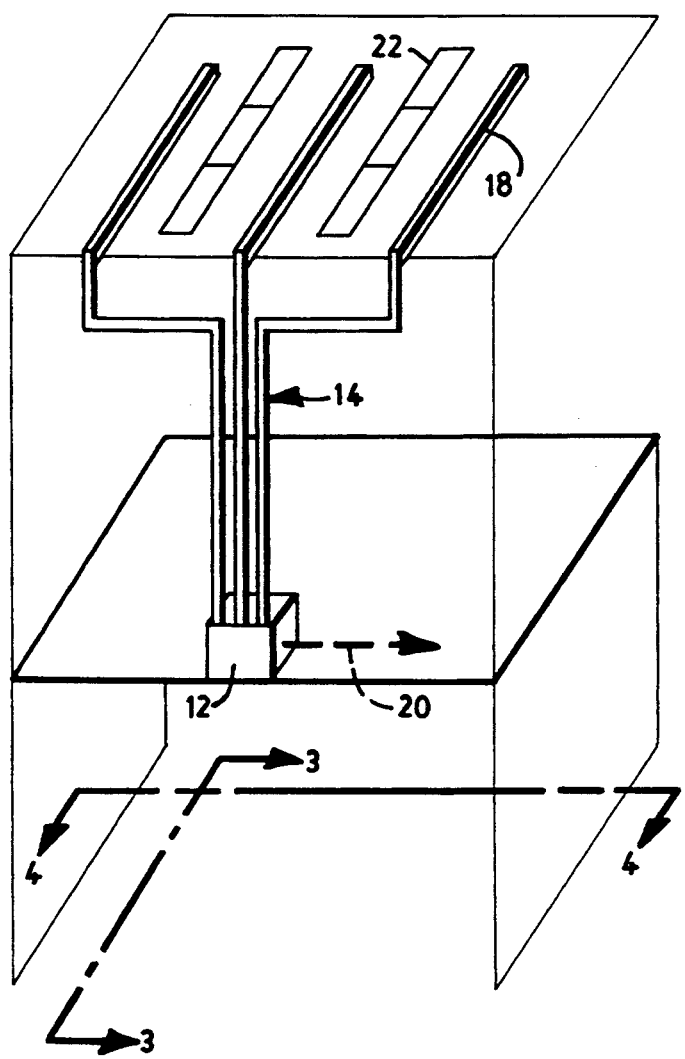
FIG. 2 is a diagrammatic perspective view of an embodiment of the invention for use with a single story building.
Figure 3:
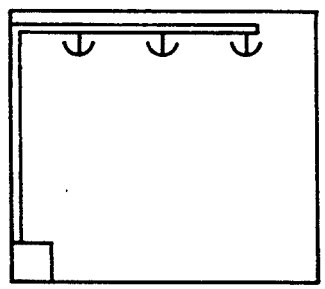
FIG. 3 is a diagrammatic section of the embodiment of FIG. 2 as indicated by 3—3.
Figure 4:
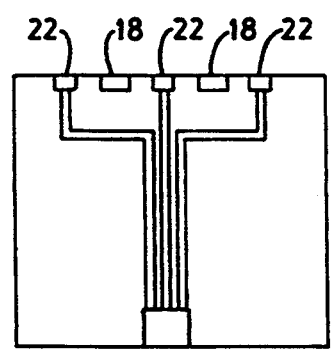
FIG. 4 is a diagrammatic sectional view of the embodiment of FIG. 2 as indicated by 4—4.

Referring to FIG. 1, a multi-story building 10 includes a central source 12 optically coupled to an illumination network 14. The illumination network 14 is made up of a series of optical distribution channels 16 coupled to the source 12 and to lighting fixtures, or luminaires 18. Briefly, light is generated in the source 12 and distributed through the network 14 to the illumination fixtures 18 which serve to illuminate rooms on the various floors of the building 10. Energy 20 is recovered from the source and may be used in the form of heat or in another form, such as electricity. Referring to FIGS. 2–4, light provided by the fixtures 18 may be supplemented by separately wired conventional electrical fixtures 22, which may be preexisting fixtures in the case of a retrofit central illumination system.

Figure 5:
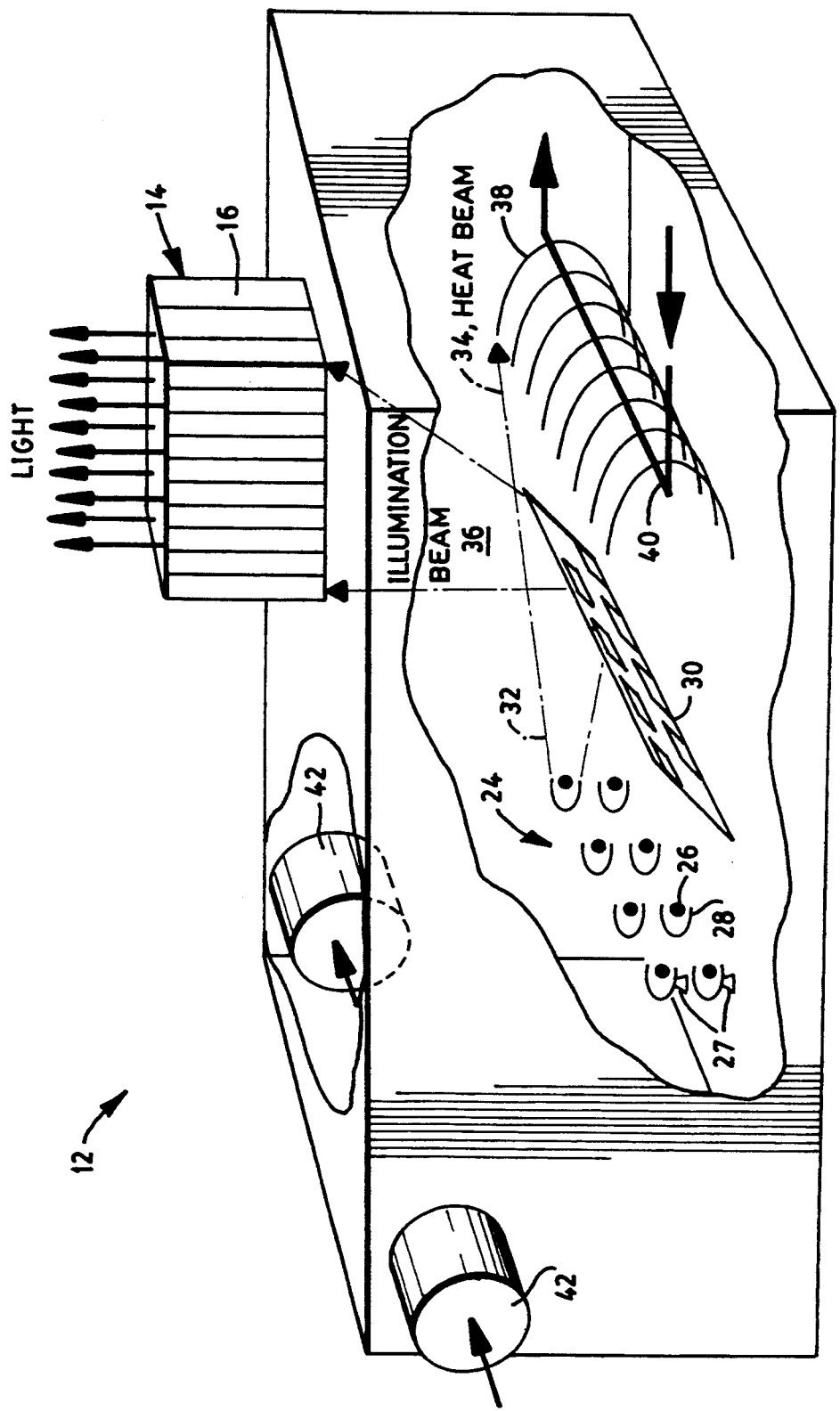
FIG. 5 is a perspective illustration of the source of FIG. 1.

Referring to FIG. 5, the central source 12 includes one or more sources 26, such as disposable Xenon Arc or HMI metal halide (Osram) lamps that may be arranged in a matrix or bank, and associated reflectors 28. A radiation splitter 30, such as a cold mirror or a matrix of cold mirrors, is positioned to receive the radiant energy beam 32 from the sources. This radiation splitter splits (or decouples) the radiant energy beam 32 generated by the source into two beams: the heat (or recovery) beam 34 and the illumination beam 36. The radiation splitter may be a selectively reflecting mirror, such as a cold mirror, which reflects energy above a transition frequency between the visible and infrared regions of the electromagnetic spectrum to split the majority of the visible energy in the source beam from the majority of the infrared energy in the source beam. The radiation splitter may also have a second transition frequency permitting inclusion of ultraviolet energy in the heat beam. Such a splitter acts as a band-reject filter, reflecting visible light while passing both infrared and ultraviolet energy. Hot mirrors and band pass filters are usable as well, requiring a reversed configuration.

The illumination beam 36 is directed to the input of the optical distribution network 14 by supporting fixtures 27, and may be coupled into the fiber by coupling optics, such as a nonimaging optic concentrator. The heat beam 34 is directed towards a nonimaging optic collection/concentration trough 38. This trough concentrates the heat beam onto a small area 40, which constitutes an input portion of a primary heat recovery system. The primary heat recovery system may include an electric generator, such as one or more photovoltaic cells, a forced liquid heating tube, or a forced air heating duct. The alignment of the sources and the positioning of the collection/concentration trough is configured to optimize the amount of infrared radiation provided to the primary heat recovery system. The input portion of the primary heat recovery system may be provided with a surface that optimizes the coupling of energy from the heat beam, such as a phosphor or other coating.

A secondary heat recovery system 42 is installed to recover source conduction and convection losses, which may be due in large part to filtered out ultraviolet radiation generated by the source. This secondary system may operate using ducted forced air or liquid, and may be partially integrated into the primary heat recovery system. Alternatively, convective and conductive heat losses may be minimized, e.g., by evacuating the housing of the source or by supporting the source in a fixture designed to optimize the level of conductive losses.

By centralizing light production, heat losses are centralized and may be concentrated to yield a very large component of high thermodynamic quality heat, which may be recycled into a power source. The lighted space may therefore be illuminated with less efficient, but more aesthetically pleasing light sources, since excess heat may be recovered. Even when compared with relatively efficient conventional lighting systems, lighting related electrical energy consumed by a building may be cut in half. Moreover, the heat generated in lighting the building contributes no heat load on the building's cooling system, resulting in further energy savings.

The radiation source of the building is, in essence, broken into two subordinate energy systems. Since source heat is recovered and used for power it can be seen that, in the traditional sense, luminous efficacy of the illumination system is directly related to only that portion of the total wattage converted to light. The energy proficiency and cost economies of centralized and conventional illumination systems may be compared by using the quantity of lumens delivered to the space as a common denominator, and establishing the overall energy required to attain that prescribed lumen output as well as the overall costs mandated by the construction of the comparative systems.

For example, it can be readily deduced that for a source with a high percentage of radiative output, such as metal halide HMI (Osram), recovery of its radiant IR (around 50% of total energy) at 80% efficiency results in a system luminous efficacy increasing from 100 lm/w to 166.7 lm/w. Similarly, recovery of radiant heat (around 90% of total energy radiated) from an incandescent halogen source at 20 lm/w at 80% efficiency would result in luminous efficacy increasing to 71 lm/w. Neither of these examples take into account the additive energy savings of eliminated lighting related cooling load or the downsizing of building cooling and heating equipment resulting from lower loads.

The nonimaging collector/concentrator trough 38, which is derived from a class of nonimaging high aberration optics, provides a method for nearly complete radiative heat collection. The high flux densities obtained in the nonimaging collection of solar energy indicate that very high temperatures can be attained in the concentration process. A discussion of these optical elements may be found in "Nonimaging Optics", Scientific American, March 1991, by Roland Winston. Nonimaging optic elements and/or related expertise is available from the NiOptics Corporation of Evanston, Ill.

The optical distribution channels 16 permit the transportation of light and may include Prism Light Guides (PLG) and/or fiber optics.

A PLG is a large aperture hollow-tube-like fiber. When used for illumination, a mirror is placed at one end of a PLG tube and a light source at the other. As light reflects back and forth a certain amount is dissipated with each pass through the walls of the tube, creating a uniform glow.

By treating the PLG tube as a light transporter, and allowing light to emerge at one end of the tube instead of being reflected back and forth along its length, a high light delivery efficiency can be attained. Since light entering and exiting the PLG is collimated to within the material's reflectance angle, luminaires placed at the open end of the tube, regardless of whether they are surface mounted, recessed, or pendant mounted, should attain a very high efficiency in their redistribution of the collimated light. Currently available transporter/diffuser grade exhibits about 80% efficiency at a length to aperture aspect ratio of 40, when utilized solely as a transport device. This limits the complexity of application in which commercially available PLG can be applied, because over a length of transport of only 40 meters the diameter of the tube becomes a gross architectural imposition if any realizable efficiency is to attained. The PLG may be designed to double as an HVAC or heating duct, however, permitting longer transport distances. Higher transmissivity grade PLG will make light transport more feasible by reducing aperture diameters, increasing transport length, and increasing transport efficiency.

Fiber optics present great potential for the low loss transport of illumination in buildings. Transport losses in relevant types of fibers remain very low and isolated to very specific regions across the entire visible (and IR) spectral ranges. One difficulty that has been encountered in the use of fiber optics is the problem of coupling the illumination into the fiber, but this may be improved by the use of an energy transfer as opposed to image transfer optical process. Unlike PLG, fiber transmission is not aspect ratio dependent; the amount of attenuation over the length of fiber transmission is independent of the fiber aperture's diameter. Theoretically, very large concentrations of illumination can be transported in fibers over long distances with nominal attenuation. The costs in installations will reflect optimizing the amount of illumination each fiber carries with the capacity of the luminaire that it is coupled to, to distribute the illumination within desired visual parameters.

The degree to which architectural lighting design is impacted by these developments will be largely incumbent upon the visual objectives of the system designers. Given the new flexibility of the medium, centralization could extend the bounds in which aesthetics are expressed. For example, by changing the beam spread and other characteristics of the fixture that modulates the light from the illumination network, a designer may either "pour" or "sprinkle" light into a space to achieve a desired effect. While one motivation in the development of this alternative method for building illumination is reducing energy consumption in buildings, a case can be made by lighting designers who feel their design objectives are compromised by availability of limited product types, or by low cost fixture substitutions that can take the place of specified fixtures in actual construction practice. It should be realized that the luminances of all current lamp and fixture combinations can be emulated through either or both types of transport methods being proposed. If desired, therefore, the end result could be virtually indistinguishable from conventional installations, except for perhaps improved color renditioning. There will be extended control over luminances in the space. As any given percentage of total building lumens can be coupled into individual fibers or trunks of hundreds of fibers, flexibility in amount of and location of luminances should extend the palette by which occupant and designer illumination objectives are met.

The complexity of lighting fixture constructions 18 may be simplified due to the reduction in the number of operations it will be designed to perform. Fixtures should not need to undergo UL or OSHA testing and approval because no electricity is required at luminaire location for lamp operation. Fixtures will no longer need structural reinforcement to support ballasts, since ballasting is centralized. Fixture construction will be further simplified by the elimination of the requirement for heat dissipation.

Since illumination entering a room from a fiber or PLG transporter emerges at a beamspread dictated by the optical configuration at the source, all lumens appearing at a room interface enter a room. Imaging lenses, reflectors, translucent materials, and/or nonimaging optic elements will further tailor the distribution characteristics of the emitted light, but they will introduce negligible losses, since the illuminance is directional. Another way of saying this is that fixture efficiencies approach 100%, and that aesthetics and distribution characteristics become the primary parameters relevant to fixture selection. As a lighting design paradigm, light distribution characteristics can be readily changed by interchanging fixture lenses to accommodated changes in mood or building function.

Radiation (illumination/heat) sources 26 such as xenon arc or HMI metal halide (Osram) lamps have a high percentage of radiant flux, ideal spectral characteristics, and low conduction losses. Efficacies for these lamps approach 100 lm/w and their lumen output can be as high as 400 or even 800 energy saving fluorescent tubes. By engineering for the optimization of a single reflector, instead of the hundreds of source reflectors it replaces, the overall proficiency at which the system operates may be improved. The radiation emitted across the very small arc of these sources lends itself well to precise optical control. The factor limiting the lumen output of individual sources, however, is the capacity of the reflecting material to withstand the high flux density that would be incumbent upon the reflector that collimates the emitted radiation onto the cold mirror for decoupling. Because of this limitation, sources may be arrayed either transversely or longitudinally to constitute a lamp bank. Additional factors such as source longevity and lumen maintenance should also be considered in system design, and it is apparent that centralization of location would accommodate the proper lamp and fixture lumen maintenance and depreciation regimens that would result in reduced light loss factors. Since HMI sources closely emulate the solar spectrum, they may meld imperceptibly when a supplemental solar collection strategy is integrated into the hardware of a building's illumination system.

Figure 6:
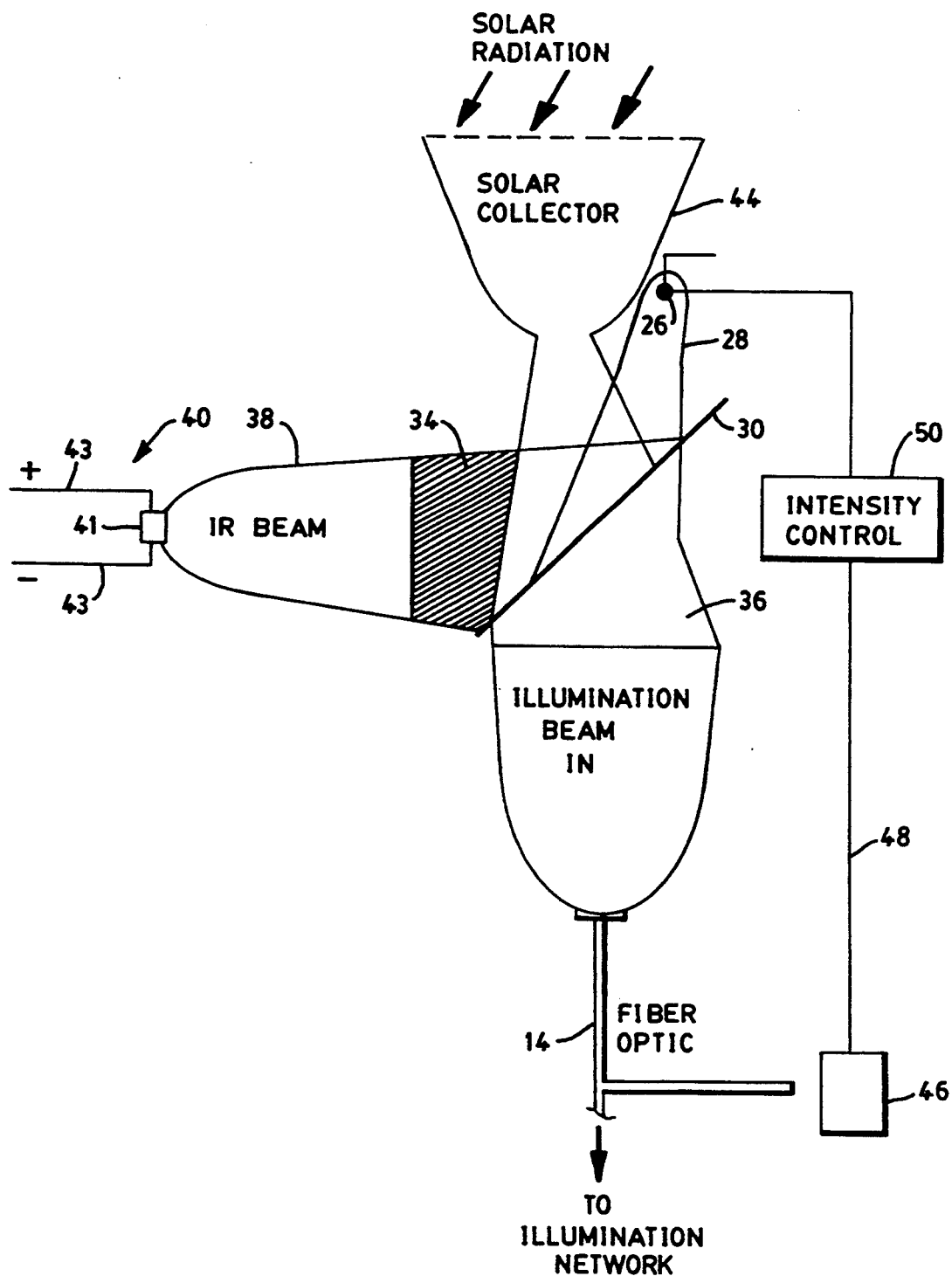
FIG. 6 is a schematic block diagram of an integrated solar/artificial illumination system according to the invention.

Supplemental solar energy may be provided to the system at the same point as is artificial light. Referring to FIG. 6, a solar collector, which is preferably a nonimaging optic solar collector 44, provides a supplemental beam of sunlight to the cold mirror 30. The cold mirror separates radiation incident upon it (artificial and/or solar) into an illumination beam 36 and a heat beam 34. Energy is recovered from the heat beam at the input of the heat recovery system, (e.g., a photovoltaic cell 41), and provided at its output (e.g., wires 43). The illumination beam is coupled to the illumination network 14. The illumination network provides a small portion of the light that it carries to a transducer 46, which provides a signal 48 that is a measure of the light intensity level within the illumination network to an intensity control circuit 50. The intensity control circuit employs ordinary feedback control principles to maintain a constant desired light intensity level within the illumination network by controlling the magnitude of the power required by the artificial light source 26 in response to the transducer output signal. In this way, during periods of insufficient solar radiation the received solar energy may be supplemented by artificial light in a continuous manner to achieve a uniform light intensity in the illumination network.

In view of a building's reduced thermal load, the illumination system's radiation source may in large part, or even completely, heat and cool the building (cooling could be accomplished via a heat absorption chiller). The supplemental solar system may collect and distribute up to the 60,000 lumens and 0.400 kw of heat that is incumbent upon each square meter of solar collector during peak hours and conditions. This peak period solar supplementation may offset a buildings's energy load to the point that building illumination, and heat and cooling power, are supplied solarly and excesses are stored, allowing the building to exist in a quasi-generative energy capacity. Furthermore, with perimeter fenestrations collaborating in a similar strategy of heat and illumination decoupling, collection and distribution, the increase in collector surface area of all exterior building surfaces suggests an even stronger likelihood that building energy self-sufficiency could be attained by these means.

Figure 7:
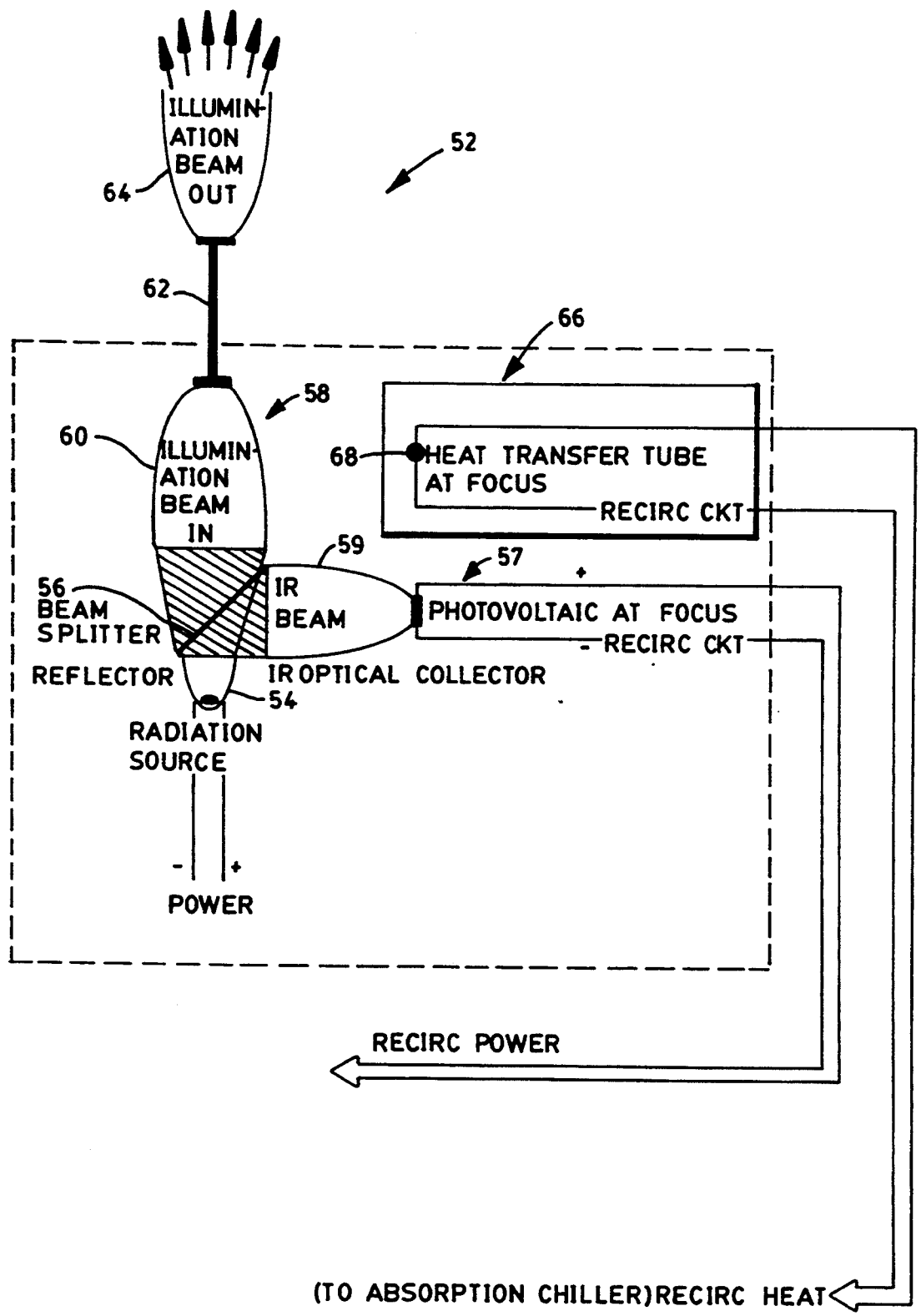
FIG. 7 is a schematic block diagram of a theater lamp embodiment.

Referring to FIG. 7, theater lighting is a particularly useful application for a system according to the invention. This is because theater lighting requires a large amount of light, and that light typically cannot be other than incandescent, as it usually requires dimming. A theater lamp 52 employing the principles of the invention includes a radiation source 54, a beam splitter 56, a primary heat recovery system 57 and a light distribution path 58, which may include a nonimaging illumination concentrator 60, a light distribution channel 62 and an illumination fixture 64. The illumination channel 62 may include a network of channels and there may be more than one illumination fixture. Alternatively, there may be only a single fixture, in which case the illumination channel can be simplified, or even be removed entirely to provide illumination directly from the beam splitter. Light may be modulated in a variety of ways to achieve a variety of beam edge shapes, crisp or blurred edges, and even or desired illumination distributions across a beam. These effects may be achieved by modulating the illumination beam with shutters, filters, lenses and/or nonimaging optic elements. Nonimaging optics may be particularly advantageous in this area, as they can permit the elimination of lenses and a consequent reduction in cost, weight and size.

The infrared energy removed from the source beam may be recovered in the form of electricity which may be used to offset the overall electric drain of the system. Alternatively, a heat transfer system 66, which may include a heat transfer tube 68 placed at the focus of the heat collection device 59, may be employed to remove heat energy from the system. This recovered heat may be provided to an absorption chiller for cooling, or be used directly as heat in heating the building.

Figure 8:
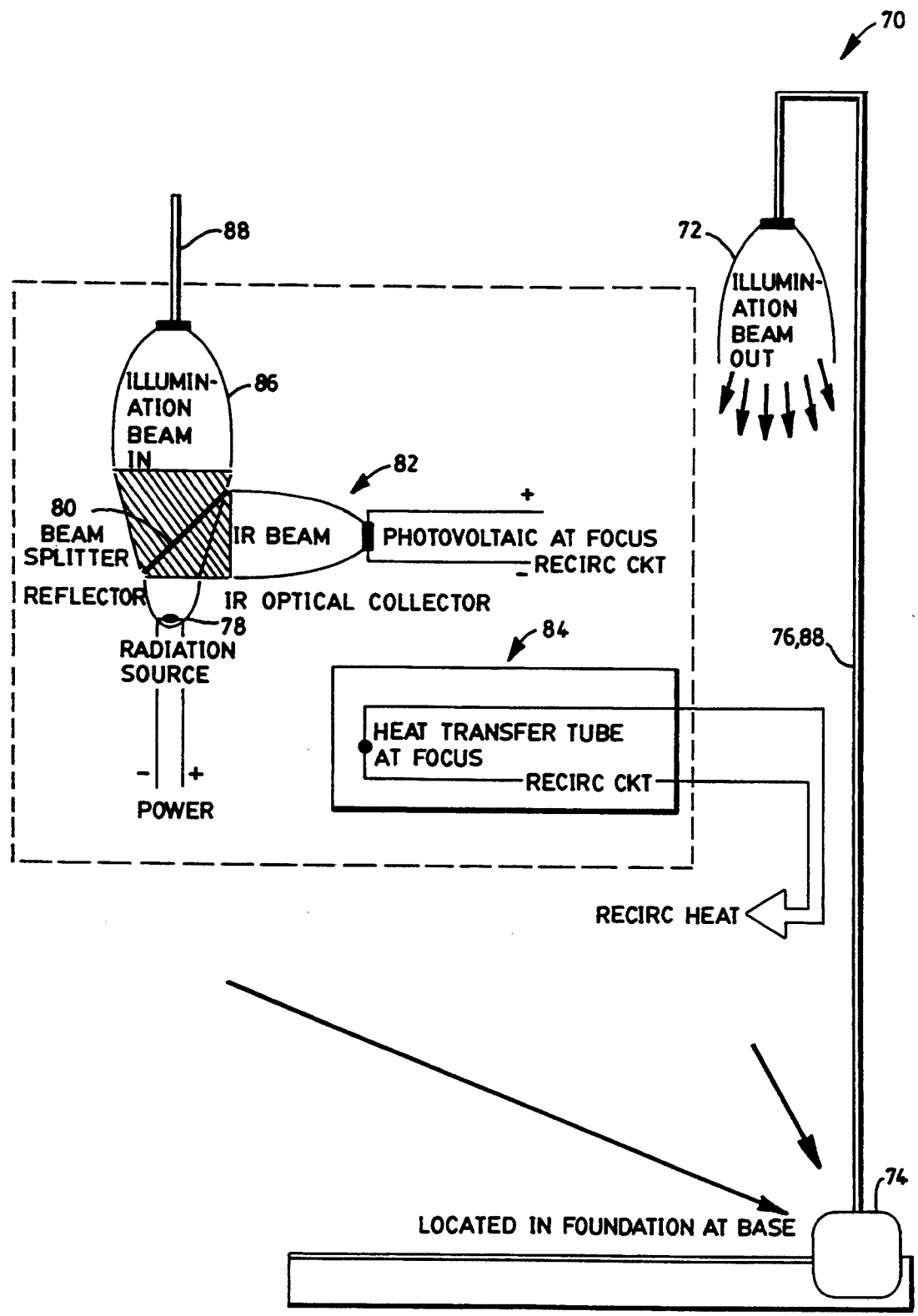
FIG. 8 is a schematic block diagram of a street lamp embodiment.

The system of the invention may also be advantageously used in a street lamp application. Referring to FIG. 8, street lamp 70 comprises one or more lighting fixtures 72 supported by a supporting portion of a cantilevered support structure 76, which includes an optical fiber 88. At the base of the street lamp supporting structure there is a foundation portion 74 that anchors the street lamp. This foundation portion may include a radiation source 78, a beam splitter 80, and a heat recovery systems (82 and/or 84). The visible light 86 is coupled into the light channel 88, and the recovered heat may be used to offset the power required by the lamp. In single-lamp embodiments, heat recovery may not be economically warranted, but the infrared energy may need to be dissipated in order to protect the optical fiber 88.

The fixture or fixtures 72 required for this street lamp simply couple the light from the light channel into the area to be illuminated, and may therefore be light, compact, and present a low wind load. This will permit reduced overturning forces at the base of the street lamp, and a lessened support structure 76. This street light is also simple to maintain, as there is no need to access the lighting fixture, which may require special equipment and/or blocking of traffic and may even need to be scheduled at night. If multiple lamps on one or more support structures are serviced by the same source, maintenance requirements are further reduced.

Figure 9:
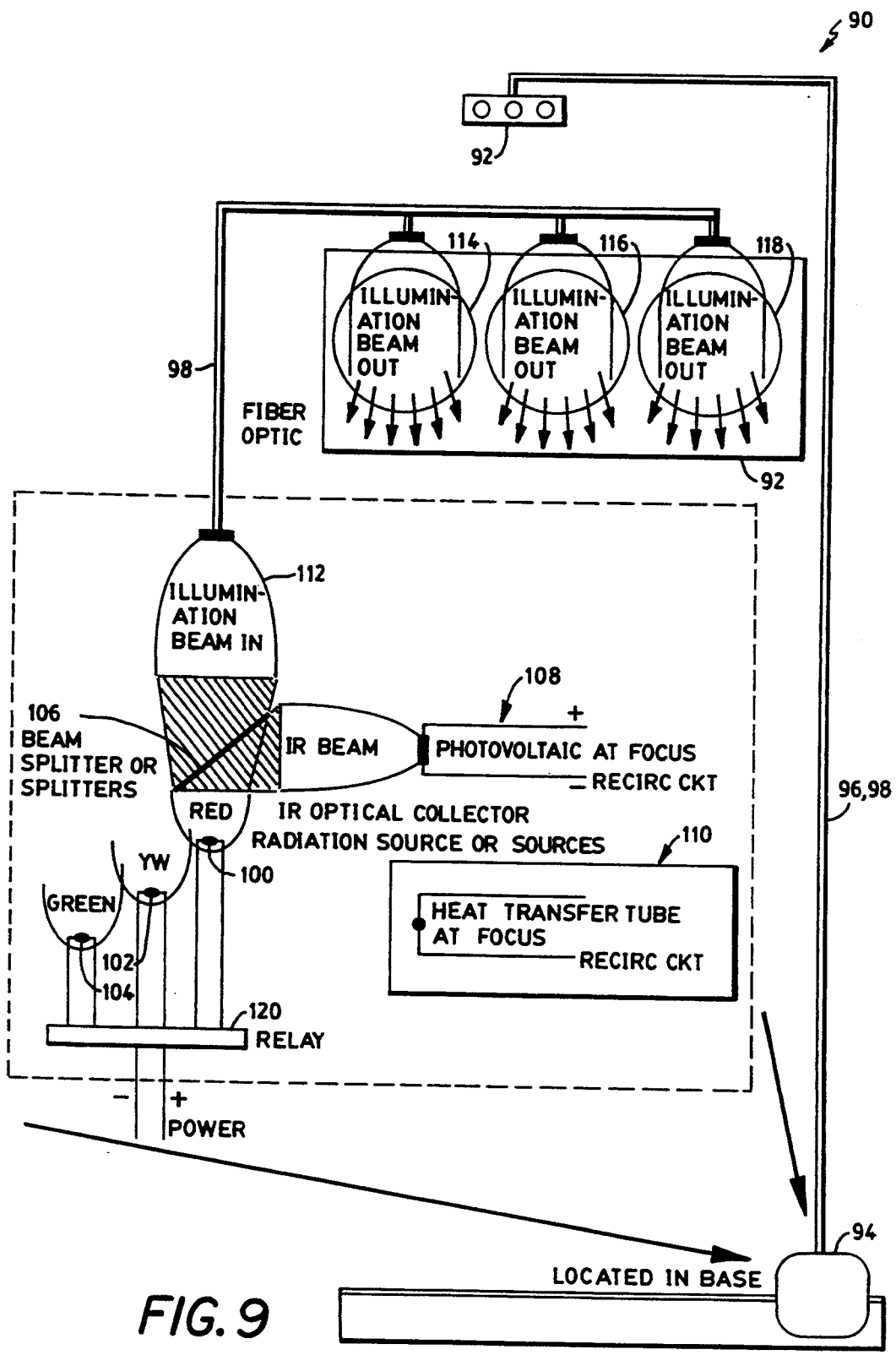
FIG. 9 is a schematic block diagram of a traffic lamp embodiment.

Referring to FIG. 9, a traffic signal embodiment 90 includes traffic signalling lamps 92, a support structure 96, which includes a light channel 98, and a foundation or base 94. The base includes a red radiation source 100, a yellow radiation source 102, and a green radiation source 104. These are directed to shine upon a beam splitter or a matrix of beam splitters 106. A heat recovery system may be provided (108 and/or 110). A visible light collector 112 collects light from the sources and provides it to a light channel 98. This light channel channels the light to all three traffic light fixtures 114, 116, 118. A relay 120 selectively energizes one of the three radiation sources in order to provide the appropriate color light for the traffic signal. The street lamp may also be constructed using separate light channels and monochromatic sources with filters (gels), or single lamp with colored filters and a selective shuttering system, which may include solid state shuttering elements. Even more than the street lamp, the traffic signal will benefit from improved safety, reduced structural requirements and lower maintenance costs. Solar supplementation may also be implemented in these embodiments.

Figure 10:
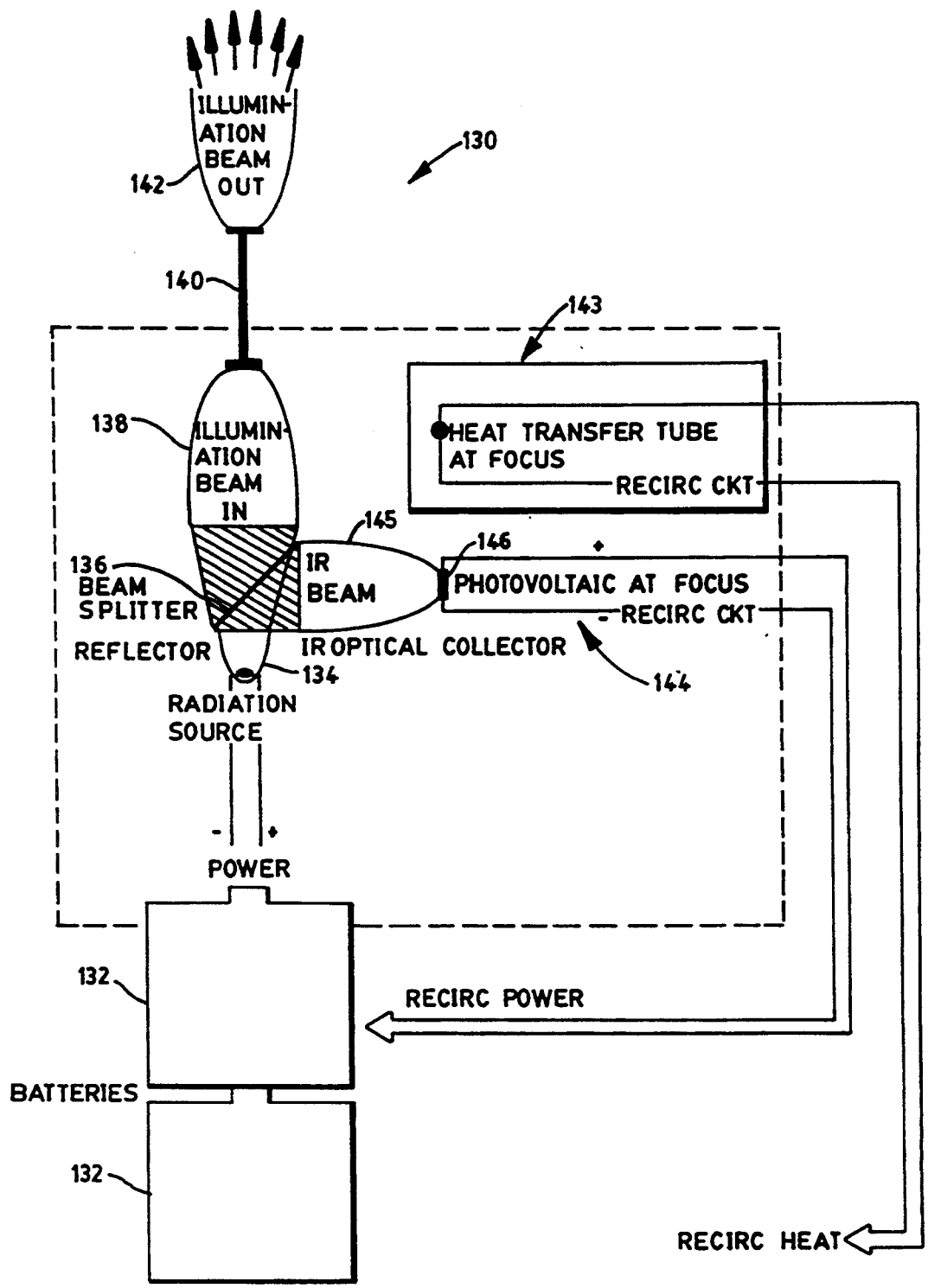
FIG. 10 is a schematic block diagram of a portable lamp embodiment.

Referring to FIG. 10, a portable light source 130 includes batteries 132, a radiation source 134, a beam splitter 136, a visible light concentrator 138, a light channel 140 (which may simply be a lens), and a light fixture 142. The beam splitter 136 separates out infrared energy 145 from the radiation source that is recovered by a primary energy recovery system 144, which may include a photovoltaic cell 146. Energy recovered may be used locally as heat or otherwise. For example, energy derived from this primary energy recovery system may be recirculated to offset drain on the batteries. The heat derived from the infrared beam in the alternate heat recovery system 143, which may include a heat transfer tube, may also be provided to the batteries. In cold weather this may provide a more hospitable environment for operation of the batteries. This portable embodiment is particularly useful in marine applications, where wiring is subject to corrosion and short-circuiting, and where power efficiency is important. It will of course be apparent to those skilled in the art that elements of the different embodiments may be combined in various ways without departing from the spirit of the invention, to produce, for example, a portable theatrical light.

Figure 11:
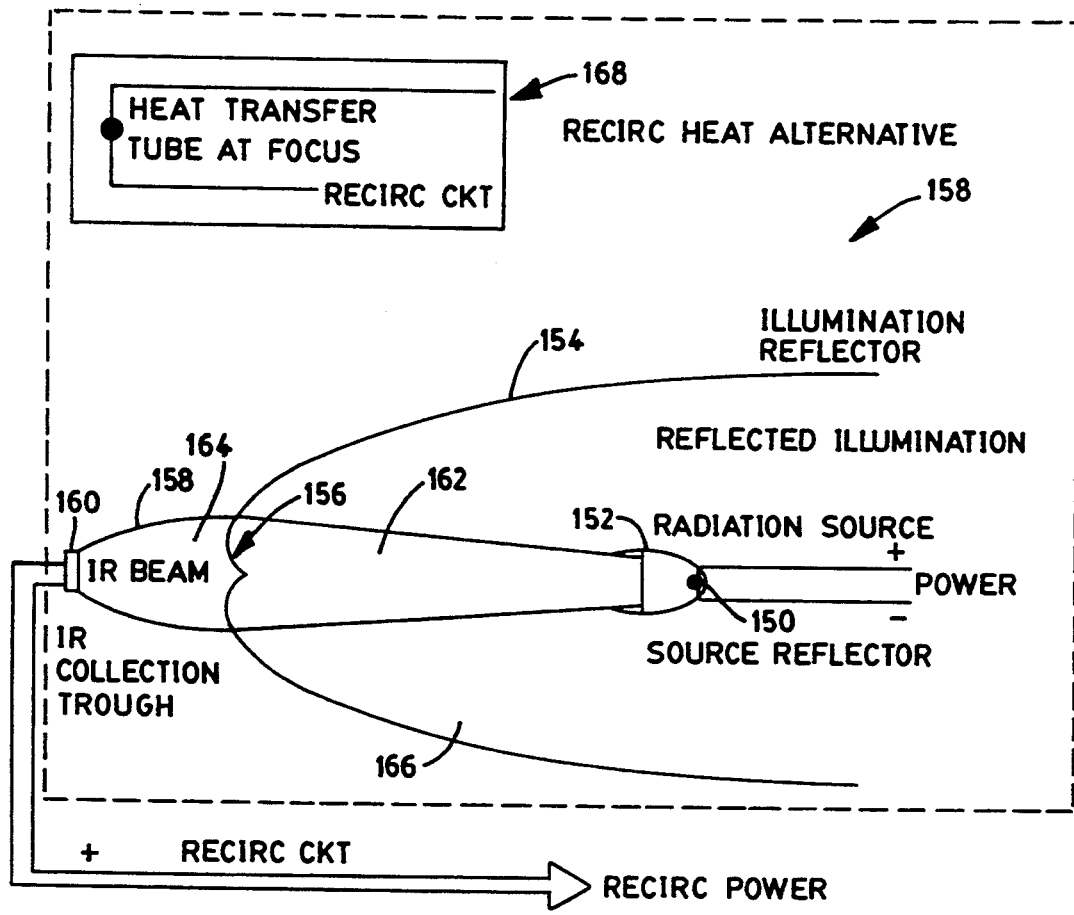
FIG. 11 is a schematic block diagram of an alternative embodiment of the centralized illumination/heat recovery source configuration.

Referring to FIG. 11, an alternative embodiment of the centralized illumination/heat recovery engine include a radiation source 150, a source reflector 152, and an illumination reflector 154. A beam splitting portion of the illumination reflector 156 is designed (e.g., selectively coated) to pass infrared energy 164 from the source beam 162 and to reflect an illumination beam 166. In this embodiment, the beam splitter is essentially integrated into the tip of the illumination reflector. Energy may be recovered from the infrared beam in a primary heat recovery system, which may include a photovoltaic 160, and/or in an alternative heat recovery system 168, which may include a heat transfer tube. The beam splitter is shaped to minimize inter-reflections between the tip of the reflector and the source and to direct reflected illumination out of the fixture, which explains the slight cusp in the illumination reflector 156. The trough is shaped to optimize the concentration of energy received from the source reflector through the beam splitting portion of the illumination reflector. The source reflector, the illumination reflector, and the IR collection trough 158 may all be non-imaging optic elements. This compact arrangement minimizes the amount of stray light exiting the illumination reflector, may be supplied as an assembly, and may be evacuated. When used in the form of an evacuated assembly, the reflective coatings need not be protected by protective coatings.

Figure 12:
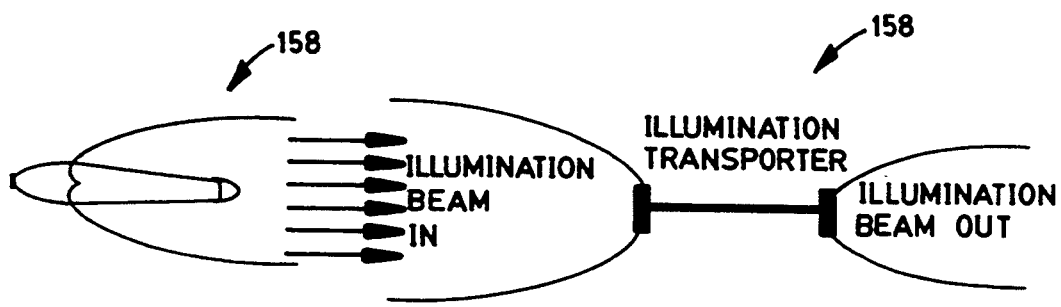
FIG. 12 is a schematic block diagram of an illumination system employing the source configuration of FIG. 11.

Referring to FIG. 12, the source assembly 158 may be used to provide illumination to an illumination network, such as the one shown in FIG. 12 158. With this source configuration, it may be preferable to recover solar heat using a separate beam splitter.

The invention may be embodied in other specific forms without departing from the spirit and the essential characteristics thereof. Accordingly, the invention is to be defined not by the proceeding description, which is intended as illustrative, but by the claims that follow.

What is claimed is:

1. An energy recovery and illumination system for a building structure, comprising:
   an artificial light source located within said building structure to emit artificial light comprising energy in visible and infrared regions of the electromagnetic spectrum,
   source reflector means for directing said artificial light into a source beam of diverging light,
   a selectively reflecting mirror into which said source beam is directed for extracting visible and infrared energy from said source beam, comprising a radiation splitter splitting at around a transition frequency between the visible and infrared regions of the electromagnetic spectrum to separate the majority of the visible energy in the source beam from the majority of the infrared energy in the source beam to form a diverging illumination beam comprising visible light and a diverging heating beam comprising infrared energy,
   a heat recovery system having an input aperture for receiving said diverging heating beam from said selectively reflecting mirror and an output for outputting recovered energy, said heat recovery system being constructed to recover energy from said heating beam using a nonimaging optical concentrator, and to provide said recovered energy at said output for use by said building structure, and
   a light conductor for receiving said illumination beam from said selectively reflecting mirror and for conducting said illumination beam to an area to be illuminated in said building structure.

2. The energy recovery and illumination system of claim 1 wherein said light conductor is constructed to further act as an air duct for ventilating said area to be illuminated.

3. The energy recovery and illumination system of claim 1 wherein said heat recovery system includes portions of a building heating system, to apply the recovered heat to heating the building.

4. The energy recovery and illumination system of claim 1 further including a secondary heat recovery system to recover further heat from said radiant source.

5. The energy recovery and illumination system of claim 1 wherein said selectively reflecting mirror radiation splitter splits at a further transition frequency between the visible and ultraviolet regions of the electromagnetic spectrum to separate the majority of the visible energy in the source beam from the majority of the ultraviolet energy in the source beam to supplement the heating beam with ultraviolet light.

6. The energy recovery and illumination system of claim 1, further comprising
   a nonimaging optical coupler for coupling said illumination beam to said light conductor.

7. A method of illumination of a building structure, comprising the steps of
   artificially generating, within a building structure, radiant energy comprising energy in visible and infrared regions of the electromagnetic spectrum,
   collecting said radiant energy into a source beam of diverging light and directing said source beam at a radiation splitter,
   splitting, with said radiation splitters, the majority of the visible energy from the majority of the infrared energy to form an illumination beam output from the radiation splitter comprising visible light and a heating beam output from the radiation splitter comprising infrared energy,
   channeling the visible energy from said illumination beam to areas of the building structure to be illuminated,
   directing the heating beam to a heat recovery system for recovering energy from said heating beam by optically concentrating said heating beam with nonimaging optics, and
   distributing said recovered energy for use by the building structure.

8. The energy recovery and illumination system of claim 1 further including a fixture for positioning said radiant source to direct said source beam in a desired direction.

* * * * *